(12) United States Patent
Lee et al.

(10) Patent No.: US 10,906,547 B2
(45) Date of Patent: Feb. 2, 2021

(54) CONTROLLING ENGINE IDLE SAILING IN A VEHICLE USING RELATIVE VEHICLE SPEED

(71) Applicants: Hyundai Motor Company, Seoul (KR); Kia Motors Corporation, Seoul (KR)

(72) Inventors: Jason Hoon Lee, Ann Arbor, MI (US); Sejun Kim, Superior Township, MI (US); Byungho Lee, Ann Arbor, MI (US); Jaihyun Lee, Ypsilanti, MI (US); Kwangwoo Jeong, Ann Arbor, MI (US); Sanghoon Yoo, Ypsilanti, MI (US)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 126 days.

(21) Appl. No.: 16/202,512

(22) Filed: Nov. 28, 2018

(65) Prior Publication Data
US 2020/0164879 A1  May 28, 2020

(51) Int. Cl.
*B60W 10/10* (2012.01)
*B60W 30/18* (2012.01)
(Continued)

(52) U.S. Cl.
CPC ...... *B60W 30/18072* (2013.01); *B60W 10/06* (2013.01); *B60W 10/10* (2013.01);
(Continued)

(58) Field of Classification Search
CPC ............ B60W 30/0956; B60W 30/16; B60W 30/162; B60W 30/18072; B60W 10/10;
(Continued)

(56) References Cited

U.S. PATENT DOCUMENTS 9,421,971 B2  8/2016  Dornieden et al.
9,650,047 B2  5/2017  Shelton et al.
(Continued)

FOREIGN PATENT DOCUMENTS

DE   102010031382 A1 *  1/2012  ............ B60W 50/10
DE   10 2011 083 332 A1   3/2013
(Continued)

OTHER PUBLICATIONS

English translation of JP2015147457A; http://translationportal.epo.org; Dec. 13, 2019 (Year: 2019).*

*Primary Examiner* — Roger L Pang
(74) *Attorney, Agent, or Firm* — Mintz Levin Cohn Ferris Glovsky and Popeo, P.C.; Peter F. Corless

(57) ABSTRACT

A method can include: detecting a distance between the host vehicle and a preceding vehicle and a current speed of the preceding vehicle; calculating a relative speed of the host vehicle with respect to the preceding vehicle based on a current speed of the host vehicle and the detected current speed of the preceding vehicle; determining whether to activate an engine idle sailing (EIS) function, in which a driving gear of the host vehicle shifts to neutral, based on the relative speed of the host vehicle with respect to the preceding vehicle and the detected distance between the host vehicle and the preceding vehicle; and in response to determining to activate the EIS function of the host vehicle, controlling operation of the host vehicle so as to activate the EIS function of the host vehicle, causing the driving gear of the host vehicle to shift to neutral.

14 Claims, 3 Drawing Sheets

(51) Int. Cl.
*B60W 10/06* (2006.01)
*B60W 30/16* (2020.01)
*B60W 30/095* (2012.01)

(52) U.S. Cl.
CPC ......... *B60W 30/16* (2013.01); *B60W 30/0956* (2013.01); *B60W 30/162* (2013.01); *B60W 2030/1809* (2013.01); *B60W 2420/42* (2013.01); *B60W 2420/52* (2013.01); *B60W 2520/10* (2013.01); *B60W 2540/10* (2013.01); *B60W 2540/12* (2013.01); *B60W 2554/801* (2020.02); *B60W 2554/804* (2020.02); *B60W 2556/65* (2020.02); *B60W 2710/065* (2013.01); *B60W 2710/1005* (2013.01)

(58) Field of Classification Search
CPC ............. B60W 10/06; B60W 2420/52; B60W 2420/42; B60W 2550/302; B60W 2030/1809; B60W 2520/10; B60W 2540/10; B60W 2540/12; B60W 2550/408; B60W 2550/308; B60W 2710/1005; B60W 2710/065
USPC .............................................. 701/54, 60, 65
See application file for complete search history.

(56) References Cited

U.S. PATENT DOCUMENTS

| | | | |
|---|---|---|---|
| 2015/0329119 A1* | 11/2015 | Sujan ..................... | F02D 41/08 701/54 |
| 2016/0054735 A1* | 2/2016 | Switkes ............... | G05D 1/0295 701/23 |
| 2017/0072961 A1 | 3/2017 | Yoon | |
| 2018/0194365 A1* | 7/2018 | Bae ..................... | B60W 40/08 |
| 2019/0351909 A1* | 11/2019 | Kook ................... | B60W 10/10 |
| 2019/0367032 A1* | 12/2019 | Ito ................... | B60W 30/18072 |

FOREIGN PATENT DOCUMENTS

| | | |
|---|---|---|
| DE | 10 2013 207 129 A1 | 10/2014 |
| JP | 2011-5920 A | 1/2011 |
| JP | 2013-226945 A | 11/2013 |
| JP | 2015-147457 A | 8/2015 |

\* cited by examiner

CONTINUE TO FIG. 2B

CONTROLLING ENGINE IDLE SAILING IN A VEHICLE USING RELATIVE VEHICLE SPEED

TECHNICAL FIELD

The present disclosure relates generally to controlling engine idle sailing in a vehicle, and more particularly, to controlling engine idle sailing in a vehicle using a relative vehicle speed.

BACKGROUND

Many modern vehicles are equipped with automated driving systems intended to improve fuel economy. For example, engine idle sailing (EIS) systems are designed to shift the driving gear of a vehicle to neutral when engine propulsion is low or not required. The operation, also known as coasting or "in-neutral" coasting, allows the vehicle to drive with an open powertrain using natural deceleration. This isolates the engine's pumping and friction losses for the drivetrain, and instead allows the vehicle to move using its own kinetic energy. Utilization of EIS can provide for fuel savings beyond other fuel economy-maximizing behaviors, such as deceleration fuel cut-off (DFCO), as well as environmental benefits by reducing amounts of carbon dioxide produced by the internal combustion engine during regular driving.

Vehicles equipped with an EIS system must activate the system at the proper time so that the sailing duration is long enough to effectively utilize the vehicle's kinetic energy. However, conventional strategies for EIS system activation management tend to limit EIS usage and fail to guarantee the sailing duration necessary to achieve significant fuel savings benefits. Often times, EIS can be activated and deactivated too frequently or at inappropriate times, resulting in degradation of the vehicle's drivability, as well as a loss of fuel saving opportunities.

SUMMARY

The present disclosure provides systems and methods for controlling an engine idle sailing (EIS) system of a host vehicle in a manner that enhances fuel economy. Particularly, an electronic control unit (ECU) of the host vehicle can control operation of the host vehicle so as to activate an EIS function of the host vehicle, in which a driving gear of the host vehicle shifts to neutral, allowing the host vehicle to coast without engine propulsion, based on a relative speed of the host vehicle with respect to a preceding vehicle and a distance between the host vehicle and the preceding vehicle.

According to embodiments of the present disclosure, a method can include: detecting, by an electronic control unit (ECU) of a host vehicle, a distance between the host vehicle and a preceding vehicle and a current speed of the preceding vehicle; calculating, by the ECU, a relative speed of the host vehicle with respect to the preceding vehicle based on a current speed of the host vehicle and the detected current speed of the preceding vehicle; determining, by the ECU, whether to activate an engine idle sailing (EIS) function of the host vehicle, in which a driving gear of the host vehicle shifts to neutral, based on the relative speed of the host vehicle with respect to the preceding vehicle and the detected distance between the host vehicle and the preceding vehicle; and in response to determining to activate the EIS function of the host vehicle, controlling, by the ECU, operation of the host vehicle so as to activate the EIS function of the host vehicle, causing the driving gear of the host vehicle to shift to neutral.

The method may further include: determining, by the ECU, whether the distance between the host vehicle and the preceding vehicle exceeds a distance threshold; and in response to determining that the distance between the host vehicle and the preceding vehicle exceeds the distance threshold, controlling, by the ECU, operation of the host vehicle so as to activate the EIS function of the host vehicle, causing the driving gear of the host vehicle to shift to neutral.

The distance threshold can be calculated based on the relative speed of the host vehicle with respect to the preceding vehicle.

The method may further include: comparing, by the ECU, the relative speed of the host vehicle with respect to the preceding vehicle with one or more predetermined relative speed thresholds; and calculating, by the ECU, the distance threshold based on the comparison of the relative speed of the host vehicle with respect to the preceding vehicle with the one or more predetermined relative speed thresholds.

The one or more predetermined relative speed thresholds includes an upper relative speed threshold and a lower relative speed threshold. In this regard, the method can further include: comparing, by the ECU, the relative speed of the host vehicle with respect to the preceding vehicle with the upper relative speed threshold; and when the relative speed of the host vehicle with respect to the preceding vehicle is less than or equal to the upper relative speed threshold, comparing, by the ECU, the relative speed of the host vehicle with respect to the preceding vehicle with the lower relative speed threshold.

The method can further include: when the relative speed of the host vehicle with respect to the preceding vehicle is greater than the upper relative speed threshold, calculating, by the ECU, the distance threshold so as to correspond to a first distance threshold; when the relative speed of the host vehicle with respect to the preceding vehicle is less than the lower relative speed threshold, calculating, by the ECU, the distance threshold so as to correspond to a second distance threshold which is less than the first distance threshold; and when the relative speed of the host vehicle with respect to the preceding vehicle is less than the upper relative speed threshold and greater than the lower relative speed threshold, calculating, by the ECU, the distance threshold so as to correspond to a third distance threshold which is less than the first distance threshold and greater than the second distance threshold.

The method can further include: calculating, by the ECU, the distance threshold based on the relative speed of the host vehicle with respect to the preceding vehicle using a non-linear equation; calculating, by the ECU, the distance threshold based on the relative speed of the host vehicle with respect to the preceding vehicle and a current traffic condition; or determining, by the ECU, the distance threshold based on the relative speed of the host vehicle with respect to the preceding vehicle using a look-up table.

The method can further include: in response to determining that the distance between the host vehicle and the preceding vehicle does not exceed the distance threshold, controlling, by the ECU, operation of the host vehicle so as to cause the driving gear of the host vehicle to shift to drive.

The detecting of the distance between the host vehicle and the preceding vehicle and the current speed of the preceding vehicle can include: sensing, by an advanced driver-assistance system (ADAS) equipped in the host vehicle, measurements indicating the distance between the host vehicle and the preceding vehicle and the current speed of the preceding vehicle; and detecting, by the ECU, the distance between the host vehicle and the preceding vehicle and the current speed of the preceding vehicle using the measurements sensed by the ADAS. In this regard, the method can further include: receiving, by the ECU, acceleration signals generated by the host vehicle; and compensating, by the ECU, the measurements sensed by the ADAS using the acceleration signals generated by the host vehicle. Also, the ADAS can sense the measurements indicating the distance between the host vehicle and the preceding vehicle and the current speed of the preceding vehicle using a camera, RADAR, vehicle-to-vehicle (V2V) communication, or any combination thereof.

The determining of whether to activate the EIS function of the host vehicle, in which the driving gear of the host vehicle shifts to neutral, can include: determining, by the ECU, whether to activate the EIS function of the host vehicle, in which the driving gear of the host vehicle shifts to neutral, based further on whether an accelerator pedal and a brake pedal of the host vehicle are depressed and whether the current speed of the host vehicle exceeds a predetermined EIS activation speed.

Furthermore, in accordance with embodiments of the present disclosure, a system can include: an advanced driver-assistance system (ADAS) equipped in a host vehicle, the ADAS configured to detect a distance between the host vehicle and a preceding vehicle and a current speed of the preceding vehicle; and one or more electronic control units (ECUs) of the host vehicle including a memory storing program instructions and a processor configured to execute the stored program instructions, which when executed cause the one or more ECUs to: calculate a relative speed of the host vehicle with respect to the preceding vehicle based on a current speed of the host vehicle and the detected current speed of the preceding vehicle; determine whether to activate an engine idle sailing (EIS) function of the host vehicle, in which a driving gear of the host vehicle shifts to neutral, based on the relative speed of the host vehicle with respect to the preceding vehicle and the distance between the host vehicle and the preceding vehicle; and in response to determining to activate the EIS function of the host vehicle, control operation of the host vehicle so as to activate the EIS function of the host vehicle, causing the driving gear of the host vehicle to shift to neutral.

Furthermore, in accordance with embodiments of the present disclosure, a non-transitory computer readable medium can contain program instructions, which when executed by one or more electronic control units (ECUs) of a host vehicle can cause the one or more ECUs to: detect a distance between the host vehicle and a preceding vehicle and a current speed of the preceding vehicle; calculate a relative speed of the host vehicle with respect to the preceding vehicle based on a current speed of the host vehicle and the current speed of the preceding vehicle; determine whether to activate an engine idle sailing (EIS) function of the host vehicle, in which a driving gear of the host vehicle shifts to neutral, based on the relative speed of the host vehicle with respect to the preceding vehicle and the distance between the host vehicle and the preceding vehicle; and in response to determining to activate the EIS function of the host vehicle, control operation of the host vehicle so as to activate the EIS function of the host vehicle, causing the driving gear of the host vehicle to shift to neutral.

BRIEF DESCRIPTION OF THE DRAWINGS

The embodiments herein may be better understood by referring to the following description in conjunction with the accompanying drawings in which like reference numerals indicate identically or functionally similar elements, of which.

Figure 1:
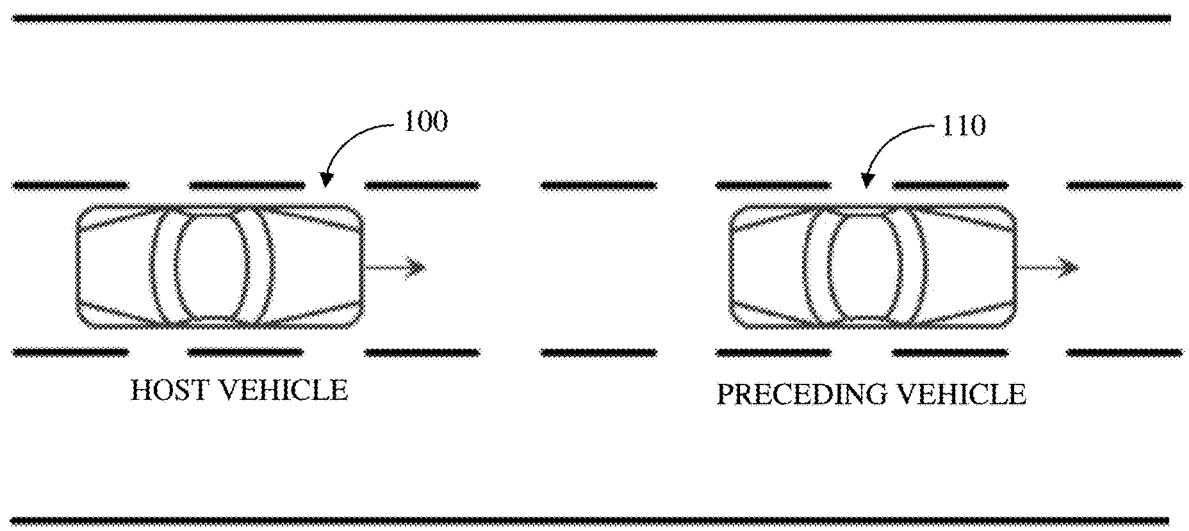
FIG. 1 is a diagram illustrating a host vehicle and a preceding vehicle.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit (or electronic control unit (ECU)). The at least one control unit or ECU may be implemented in a vehicle, as described herein. The term "control unit" may refer to a hardware device that includes a memory and a processor. The memory is configured to store program instructions, and the processor is specifically programmed to execute the program instructions to perform one or more processes which are described further below. The control unit may control operation of units, modules, parts, or the like, as described herein. Moreover, it is understood that the below methods may be executed by an apparatus comprising the control unit in conjunction with one or more other components, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a controller area network (CAN).

Referring now to embodiments of the present disclosure, an engine idle sailing (EIS) system of a host vehicle can be controlled in a manner that extends the "sailing" (i.e., vehicle coasting) duration and creates additional coasting opportunities in order to enhance fuel economy. A combination of one or more sensors can detect a relative speed of the host vehicle with respect to a preceding vehicle and a distance between the host vehicle and the preceding vehicle. An electronic control unit (ECU) can use such information to control operation of the host vehicle so as to activate an EIS function of the host vehicle, in which a driving gear of the host vehicle shifts to neutral, allowing the host vehicle to coast without engine propulsion. By considering relative speed and distance between the vehicles, the EIS control logic described herein can capture additional sailing opportunities, thereby further improving fuel economy and reducing carbon dioxide production.

FIG. 1 is a diagram illustrating a host vehicle 100 and a preceding vehicle 110. As shown in FIG. 1, the host vehicle 100 can follow or travel behind the preceding vehicle 110. In some cases, the host vehicle 100 can be driving in the same lane as the preceding vehicle 110. In other cases, the host vehicle 100 can be driving in a lane adjacent to the preceding vehicle 110 when no other preceding vehicles are in the same lane as the host vehicle 100.

The host vehicle 100 can be equipped with an advanced driver-assistance system (ADAS) generally designed to assist in the driving process. The ADAS can include a partially or fully automated system equipped with a combination of one or more sensors for detected a variety of measurements. For example, the ADAS can provide a wide variety of assistive features such as automated external and/or internal lighting, adaptive cruise control, collision avoidance, pedestrian crash avoidance mitigation (PCAM), wireless communication (e.g., with a mobile device and/or a remote server), driver alerts (e.g., traffic, obstacles, drowsiness, etc.), lane departure warnings, automatic lane centering, blind spot monitoring, and the like.

The ADAS of the host vehicle 100 can utilize a combination of one or more sensors to obtain inputs from multiple data sources, including automotive imaging, LiDAR (light detection and ranging), RADAR (radio detection and ranging), image processing (using images obtained via a camera), computer vision, in-car networking, and the like. The ADAS can additionally utilize inputs from external sources such as other vehicles, referred to as Vehicle-to-Vehicle (V2V) communication, remote servers (e.g., mobile networks, WiFi networks), referred to as Vehicle-to-Infrastructure (V2I) communication, and the like.

The ADAS can be communicatively coupled to an electronic control unit (ECU) of the host vehicle 100. As such, the ECU can utilize information collected by the ADAS for the purpose of controlling operation of one or more components of the host vehicle 100. For instance, the ADAS can detect a current speed of the preceding vehicle 110, and the ECU can use the detected speed of the preceding vehicle 110 to calculate the relative speed of the host vehicle 100 with respect to the preceding vehicle 110. The ADAS can also detect a distance between the host vehicle 100 and the preceding vehicle 110. Then, the ECU can utilize said information to control operation of the host vehicle 100, and particularly, an engine idle sailing (EIS) system of the host vehicle 100, as explained in greater detail below.

Figure 2A:
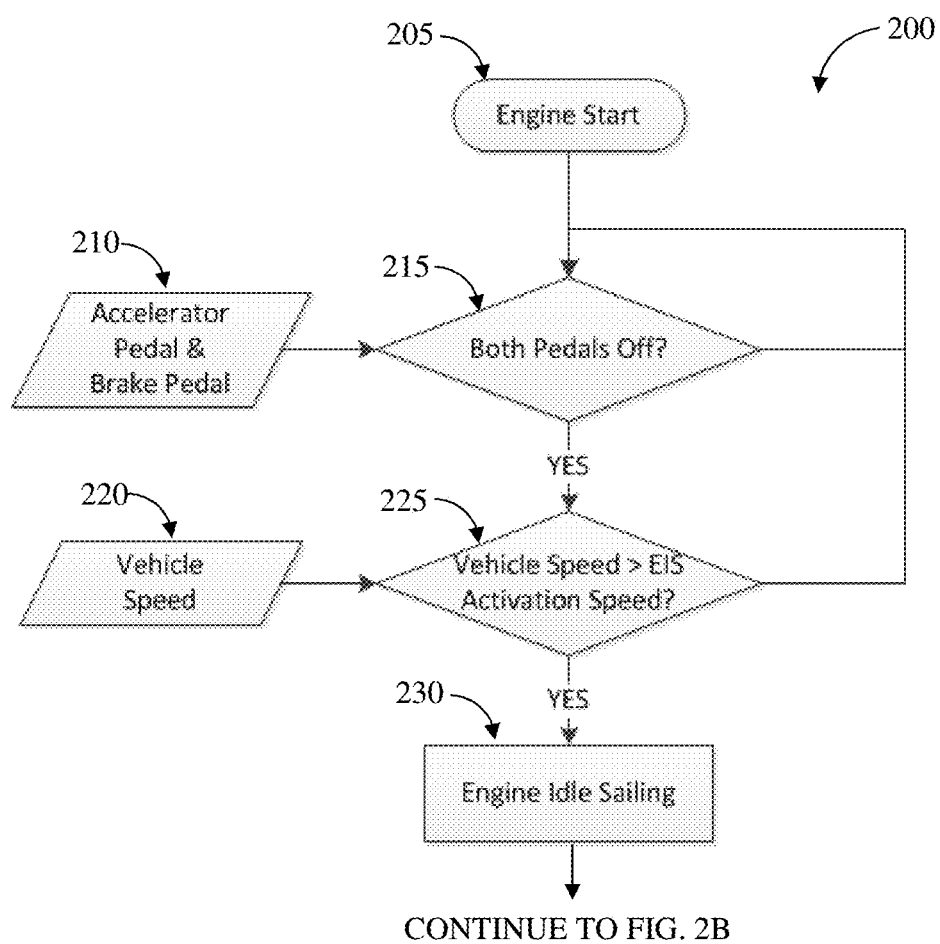
FIGS. 2A and 2B include a flow chart illustrating an exemplary simplified procedure for controlling an EIS system of the host vehicle.
Figure 2B:
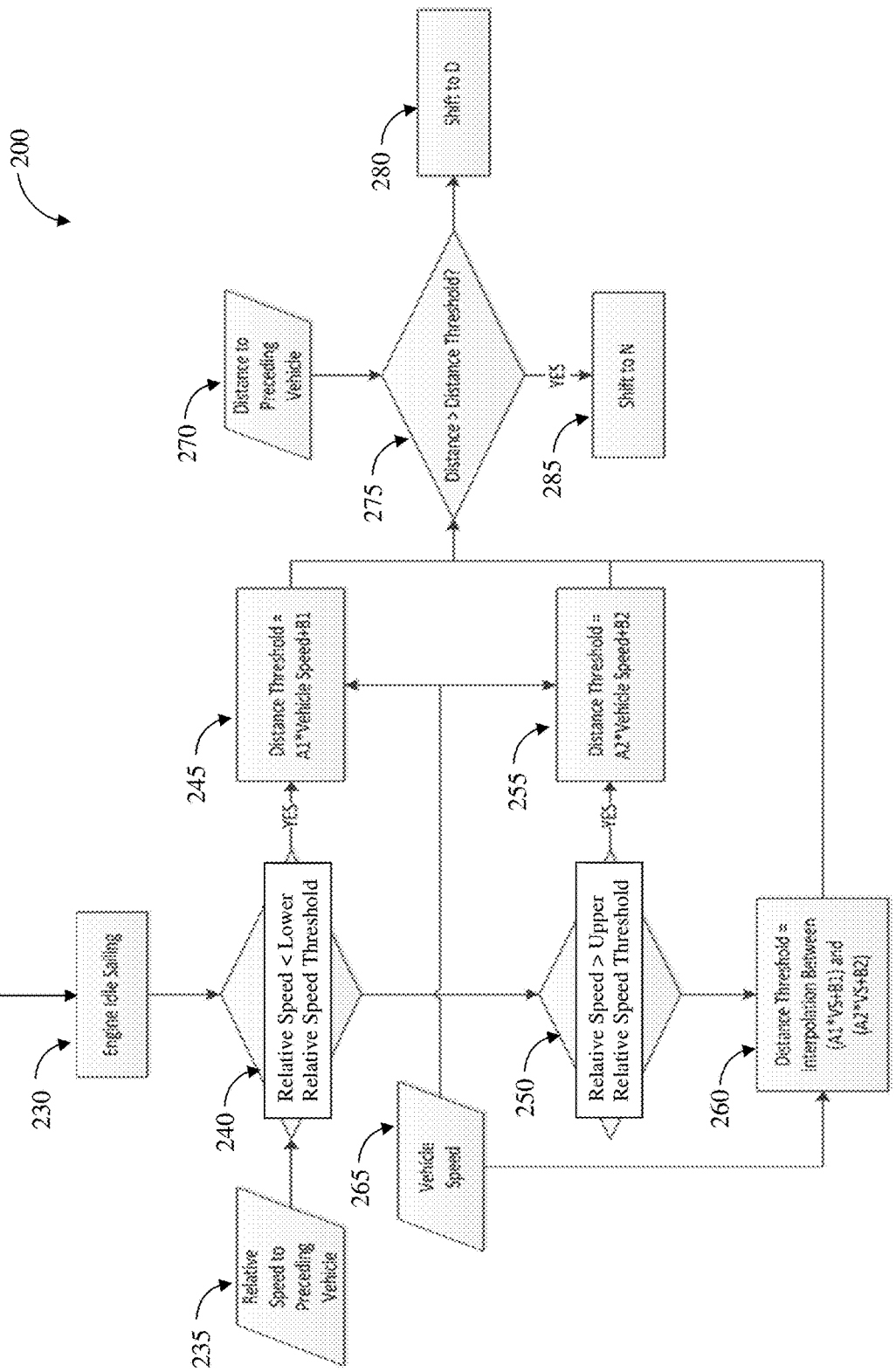

FIGS. 2A and 2B include a flow chart illustrating an exemplary simplified procedure for controlling an EIS system of the host vehicle 100. The procedure 200 may start at step 205, and continue to step 210, where, as described in greater detail below, the ECU of the host vehicle 100 can control operation of the EIS system so as to activate an EIS function of the host vehicle 100, in which a driving gear of the host vehicle 100 shifts to neutral, based on the relative speed of the host vehicle 100 with respect to the preceding vehicle 110 and the distance between the host vehicle 100 and the preceding vehicle 110. Unless indicated otherwise, the steps of procedure 200 can be performed by the ECU (not shown) of the host vehicle 100. Although ECU is generally referred to herein in singular form (e.g., "an ECU" or "the ECU"), a plurality of ECUs can be responsible for performing the tasks described herein.

Initially, the ECU can determine whether certain conditions are satisfied for activation of the EIS system. At step 205, the engine of the host vehicle 100 can start, e.g., by turning the ignition key, activating an ignition button or switch, etc. At step 210, the ECU can collect one or more signals, e.g., from a pedal sensor, indicating whether the accelerator and brake pedals of the host vehicle 100 are depressed. If the ECU determines that neither pedal is depressed (i.e., both pedals are in an off-state), at step 215, the procedure 200 can continue to steps 220 and 225. Otherwise, the ECU can wait until neither pedal is depressed before proceeding.

At step 220, the ECU can collect one or more signals, e.g., from a speed sensor, indicating the current speed of the host vehicle 100. If the ECU determines that the current speed of the host vehicle 100 is greater than a predefined EIS activation speed, at step 225, the EIS system of the host vehicle 100 can be activated (step 230), wherein the driving gear of the host vehicle 100 can be shifted to neutral under certain conditions, enabling the vehicle to coast without engine propulsion, as described in greater detail below. The predefined EIS activation speed can be any speed (e.g., 5 meters per second (m/s), 7 m/s, 10 m/s, etc.) desired by the system designer, as would be understood by a person possessing an ordinary level of skill in the art.

After activating the EIS system, at step 230, the ECU can calculate the relative speed of the host vehicle 100 with respect to the preceding vehicle 110 (step 235). To this end, the ADAS of the host vehicle 100, as described above, can detect a current speed of the preceding vehicle 110. The ADAS can detect the current speed of the preceding vehicle 110 using one or more sensors of the ADAS such as, for example, one or more cameras, RADAR, LiDAR, V2V communication, or any combination thereof. The ECU can utilize the current speed of the preceding vehicle 110, as detected by the ADAS, in conjunction with the current speed of the host vehicle 100 (detected in step 220) to calculate the relative speed of the host vehicle 100 with respect to the preceding vehicle 110.

Moreover, the ECU can utilize additional information to compensate the measurements sensed by the ADAS. For instance, the ECU can receive acceleration signals generated by the host vehicle 100, and can compensate the measurements sensed by the ADAS using the acceleration signals.

For example, if the host vehicle 100 is traveling 25 m/s, and the preceding vehicle 110 is traveling 22 m/s, the host vehicle 100 is traveling at a relative speed of +3 m/s with respect to the preceding vehicle 110. Conversely, if the host vehicle 100 is traveling 20 m/s, and the preceding vehicle 110 is traveling 22 m/s, the host vehicle 100 is traveling at a relative speed of −2 m/s with respect to the preceding vehicle 110. The relative speed of the host vehicle 100 can indicate whether the host vehicle 100 is moving faster than the preceding vehicle 110, causing the distance therebetween to decrease, or moving slower than preceding vehicle 110, causing the distance therebetween to increase.

Next, the ECU can compare the relative speed of the host vehicle 100 with respect to the preceding vehicle 110 with one or more predetermined relative speed thresholds. In one example, the ECU can compare the relative speed of the host vehicle 100 with respect to the preceding vehicle 110 with an upper relative speed threshold and with a lower relative speed threshold, as demonstrated in FIG. 2B and described below.

At step 240, the ECU can compare the relative speed of the host vehicle 100 with respect to the preceding vehicle 110 with a predetermined lower relative speed threshold. The lower relative speed threshold can be any speed desired by the system designer that is less than the upper relative speed threshold, as would be understood by a person possessing an ordinary level of skill in the art. According to the example of procedure 200, the lower relative speed can be set to a negative speed (e.g., −3 m/s, −5 m/s, etc.).

If the relative speed of the host vehicle 100 with respect to the preceding vehicle 110 is less than the lower relative speed threshold, that is, the host vehicle 100 is traveling slower than the preceding vehicle 110 (assuming the lower relative speed threshold corresponds to a negative speed), it can indicate that the distance between the host vehicle 100 and the preceding vehicle 110 is increasing. In this case, the procedure 200 can continue to step 245, where the ECU can calculate a distance threshold (i.e., "first distance threshold") based on the comparison of the relative speed of the host vehicle 100 with the lower relative speed threshold.

For the purposes of the present disclosure, the distance threshold can represent a threshold value to be compared with the distance between the host vehicle 100 and the preceding vehicle 110. If the distance between the host vehicle 100 and the preceding vehicle 110 exceeds the distance threshold, the ECU can activate an EIS operation in which a driving gear of the host vehicle 100 is shifted to neutral (step 285), causing the host vehicle 100 to coast without engine propulsion. This portion of the procedure 200 is described in greater detail below.

According to the example of procedure 200, the distance threshold can be dynamically calculated based upon the comparison of the relative speed of the host vehicle 100 with respect to the preceding vehicle 110 with one or more predetermined relative speed thresholds. Alternatively, the distance threshold can be predetermined (i.e., fixed). In such case, a single predetermined distance threshold can be used for comparison with the distance between the host vehicle 100 and the preceding vehicle 100, or multiple predetermined distance thresholds can be used for comparison with the distance between the host vehicle 100 and the preceding vehicle 100, in which case a longer predetermined distance threshold can be utilized when the distance between the host vehicle 100 and the preceding vehicle 100 is decreasing (making activation of the EIS operation less likely), and a shorter predetermined distance threshold can be utilized when the distance between the host vehicle 100 and the preceding vehicle 100 is increasing (making activation of the EIS operation more likely).

Referring again to step 245, the procedure 200 continues to step 245 when it is determined, at step 240, that the relative speed of the host vehicle 100 with respect to the preceding vehicle 110 is less than the lower relative speed threshold, indicating that the distance between the host vehicle 100 and the preceding vehicle 110 is increasing. In this case, the distance threshold can be calculated to be less than the distance threshold calculated in step 255, meaning that the EIS operation in which a driving gear of the host vehicle 100 is shifted to neutral (step 285) can be activated by the ECU even when the host vehicle 100 is closer to, relatively speaking, the preceding vehicle 110. Thus, activation of the EIS operation, causing the driving gear of the host vehicle 100 to shift to neutral, is more likely.

In one example, the distance threshold can be calculated at step 245 according to Equation 1, as shown below:

$$\text{Distance Threshold} = (A1 \times \text{Host Vehicle Speed}) + B \quad \text{[Equation 1]}$$

Here, A1 can correspond to a coefficient used to scale the distance threshold upwardly or downwardly as desired, and B can correspond to a buffer distance between the host vehicle 100 and the preceding vehicle 110. Coefficient A1 can be any value (e.g., 0.25, 0.5, 1.0, etc.) which is less than coefficient A2 (described below) desired by the system designer, as would be understood by a person possessing an ordinary level of skill in the art. For example, if the host vehicle 100 is traveling at 60 miles per hour (mph), as determined by the ECU in step 265, A1 is equal to 0.5, and buffer distance B is equal to 10 feet, the distance threshold calculated in step 245 can equal 40 feet.

The distance threshold described herein can be calculated using additional or alternative techniques, as well. For instance, the distance threshold can be calculated using a variety of equations different from Equation 1 (above) and Equation 2 (below), including non-linear equations. Also, the distance threshold can be determined using a look-up table containing previously generated values. Also, the ECU can determine current traffic conditions (e.g., through communication with a remote server) and calculate the distance threshold in light of a current traffic condition (e.g., vehicle accident present, construction present, etc.).

Conversely, if it is determined at step 240 that the relative speed of the host vehicle 100 with respect to the preceding vehicle 110 is greater than or equal to the lower relative speed threshold, the procedure 200 can continue to step 250 where the ECU can compare the relative speed of the host vehicle 100 with respect to the preceding vehicle 110 with a predetermined upper relative speed threshold. The upper relative speed threshold can be any speed desired by the system designer that is greater than the lower relative speed threshold, as would be understood by a person possessing an ordinary level of skill in the art. According to the example of procedure 200, the upper relative speed can be set to a positive speed (e.g., +3 m/s, +5 m/s, etc.).

If the relative speed of the host vehicle 100 with respect to the preceding vehicle 110 is greater than the upper relative speed threshold, that is, the host vehicle 100 is traveling faster than the preceding vehicle 110 (assuming the upper relative speed threshold corresponds to a positive speed), it can indicate that the distance between the host vehicle 100 and the preceding vehicle 110 is decreasing. In this case, at step 255, the distance threshold (i.e., "second distance threshold") can be calculated to be greater than the distance threshold calculated in step 245, meaning that the EIS operation in which a driving gear of the host vehicle 100 is shifted to neutral (step 285) can be activated by the ECU only when the host vehicle 100 is further away, relatively speaking, from the preceding vehicle 110. Thus, activation of the EIS operation, causing the driving gear of the host vehicle 100 to shift to neutral, is less likely. This is because unpredictable driver interruption (e.g., sudden braking) is possible, and it may be unsafe for the host vehicle 100 to be in neutral in such situation.

In one example, the distance threshold can be calculated at step 255 according to Equation 2, as shown below:

$$\text{Distance Threshold} = (A2 \times \text{Host Vehicle Speed}) + B \quad \text{[Equation 2]}$$

Here, A2 can correspond to a coefficient used to scale the distance threshold upwardly or downwardly as desired, and B can correspond to a buffer distance between the host vehicle 100 and the preceding vehicle 110. Coefficient A2 can be any value (e.g., 2.0, 2.5, 3.0, etc.) which is greater than coefficient A1 (described above) desired by the system designer, as would be understood by a person possessing an ordinary level of skill in the art. For example, if the host vehicle 100 is traveling at 60 miles per hour (mph), as determined by the ECU in step 265, A2 is equal to 2.0, and buffer distance B is equal to 10 feet, the distance threshold calculated in step 255 can equal 130 feet.

If, at step 250, it is determined that the relative speed of the host vehicle 100 with respect to the preceding vehicle 110 is less than or equal to the upper relative speed threshold, the procedure 200 can continue to step 260. Here, it can be determined that the relative speed of the host vehicle 100 is greater than or equal to the lower relative speed threshold and less than or equal to the upper relative speed threshold. Accordingly, at step 260, the distance threshold (i.e., "third distance threshold") can be calculated as value between the distance thresholds calculated in steps 245 and 255, respectively. That is, the distance threshold calculated at step 260 can represent an interpolation of Equation 1 and Equation 2.

At step 275, the ECU can compare the distance between the host vehicle 100 and the preceding vehicle 110 with the distance threshold calculated in either step 245, 255 or 260, as described above. In this regard, the ECU can collect information from the ADAS of the host vehicle 100 indicative of the distance from the host vehicle 100 to the preceding vehicle 110 (step 270). The ADAS, as described above, can detect the distance from the host vehicle 100 to the preceding vehicle 110 using one or more sensors of the ADAS such as, for example, one or more cameras, RADAR, LiDAR, V2V communication, or any combination thereof.

If, at step 275, the ECU determines that the distance between the host vehicle 100 and the preceding vehicle 110, as detected by the ADAS, is less than or equal to the distance threshold, the driving gear of the host vehicle 100 can either shift to drive or remain in drive (step 280). That is, the EIS function, in which the driving gear of the host vehicle 100 shifts to neutral, is not activated when the distance between the host vehicle 100 and the preceding vehicle 110 is less than or equal to the distance threshold. Thus, the engine can continue to propel the host vehicle 100.

Conversely, if the ECU determines that the distance between the host vehicle 100 and the preceding vehicle 110 is greater than the distance threshold, the ECU can control operation of the host vehicle 100 so as to activate the EIS function, in which the driving gear of the host vehicle 100 shifts to neutral (step 285). Upon activation of the EIS function, the host vehicle 100 can be shifted to neutral, thereby causing the host vehicle 100 to coast without engine propulsion.

The procedure 200 illustratively ends at steps 280 or 285. The techniques by which the steps of procedure 200 may be performed, as well as ancillary procedures and parameters, are described in detail above.

It should be noted that the steps shown in FIG. 2 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Even further, the illustrated steps may be modified in any suitable manner in accordance with the scope of the present claims.

Accordingly, systems and methods described herein provide for improved engine idle sailing (EIS) control for vehicles. By considering a relative speed of a vehicle and a distance between the vehicle and a preceding vehicle, the EIS control techniques described herein can extend the "sailing" (i.e., vehicle coasting) duration and create additional coasting opportunities. These operations result in enhanced fuel economy, while also reducing carbon dioxide production.

The foregoing description has been directed to embodiments of the present disclosure. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   detecting, by an electronic control unit (ECU) of a host vehicle, a distance between the host vehicle and a preceding vehicle and a current speed of the preceding vehicle;
   calculating, by the ECU, a relative speed of the host vehicle with respect to the preceding vehicle based on a current speed of the host vehicle and the detected current speed of the preceding vehicle;
   determining, by the ECU, whether to activate an engine idle sailing (EIS) function of the host vehicle, in which a driving gear of the host vehicle shifts to neutral, based on the relative speed of the host vehicle with respect to the preceding vehicle and the detected distance between the host vehicle and the preceding vehicle; and
   in response to determining to activate the EIS function of the host vehicle, controlling, by the ECU, operation of the host vehicle so as to activate the EIS function of the host vehicle, causing the driving gear of the host vehicle to shift to neutral,
   wherein the determining of whether to activate the EIS function of the host vehicle, in which the driving gear of the host vehicle shifts to neutral, comprises:
      determining, by the ECU, whether to activate the EIS function of the host vehicle, in which the driving gear of the host vehicle shifts to neutral, based further on whether an accelerator pedal and a brake pedal of the host vehicle are depressed and whether the current speed of the host vehicle exceeds a predetermined EIS activation speed.

2. The method of claim 1, further comprising:
   determining, by the ECU, whether the distance between the host vehicle and the preceding vehicle exceeds a distance threshold; and
   in response to determining that the distance between the host vehicle and the preceding vehicle exceeds the distance threshold, controlling, by the ECU, operation of the host vehicle so as to activate the EIS function of the host vehicle, causing the driving gear of the host vehicle to shift to neutral.

3. The method of claim 2, wherein the distance threshold is calculated based on the relative speed of the host vehicle with respect to the preceding vehicle.

4. The method of claim 3, further comprising:
   comparing, by the ECU, the relative speed of the host vehicle with respect to the preceding vehicle with one or more predetermined relative speed thresholds; and
   calculating, by the ECU, the distance threshold based on the comparison of the relative speed of the host vehicle with respect to the preceding vehicle with the one or more predetermined relative speed thresholds.

5. The method of claim 4, wherein the one or more predetermined relative speed thresholds includes an upper relative speed threshold and a lower relative speed threshold.

6. The method of claim 5, wherein the comparing of the relative speed of the host vehicle with respect to the preceding vehicle with one or more predetermined relative speed thresholds comprises:
   comparing, by the ECU, the relative speed of the host vehicle with respect to the preceding vehicle with the lower relative speed threshold; and
   when the relative speed of the host vehicle with respect to the preceding vehicle is greater than or equal to the lower relative speed threshold, comparing, by the ECU, the relative speed of the host vehicle with respect to the preceding vehicle with the upper relative speed threshold.

7. The method of claim 6, further comprising:
   when the relative speed of the host vehicle with respect to the preceding vehicle is less than the lower relative speed threshold, calculating, by the ECU, the distance threshold so as to correspond to a first distance threshold;
   when the relative speed of the host vehicle with respect to the preceding vehicle is greater than the upper relative speed threshold, calculating, by the ECU, the distance threshold so as to correspond to a second distance threshold which is less than the first distance threshold; and
   when the relative speed of the host vehicle with respect to the preceding vehicle is less than the upper relative speed threshold and greater than the lower relative speed threshold, calculating, by the ECU, the distance threshold so as to correspond to a third distance threshold which is less than the first distance threshold and greater than the second distance threshold.

8. The method of claim 3, further comprising:
   calculating, by the ECU, the distance threshold based on the relative speed of the host vehicle with respect to the preceding vehicle and a current traffic condition.

9. The method of claim 3, further comprising:
   determining, by the ECU, the distance threshold based on the relative speed of the host vehicle with respect to the preceding vehicle using a look-up table.

10. The method of claim 2, further comprising:
    in response to determining that the distance between the host vehicle and the preceding vehicle does not exceed the distance threshold, controlling, by the ECU, operation of the host vehicle so as to cause the driving gear of the host vehicle to shift to drive.

11. The method of claim 1, wherein detecting of the distance between the host vehicle and the preceding vehicle and the current speed of the preceding vehicle comprises:
    sensing, by an advanced driver-assistance system (ADAS) equipped in the host vehicle, measurements indicating the distance between the host vehicle and the preceding vehicle and the current speed of the preceding vehicle; and
    detecting, by the ECU, the distance between the host vehicle and the preceding vehicle and the current speed of the preceding vehicle using the measurements sensed by the ADAS.

12. The method of claim 11, further comprising:
    receiving, by the ECU, acceleration signals generated by the host vehicle; and
    compensating, by the ECU, the measurements sensed by the ADAS using the acceleration signals generated by the host vehicle.

13. A system comprising:
    an advanced driver-assistance system (ADAS) equipped in a host vehicle, the ADAS configured to detect a distance between the host vehicle and a preceding vehicle and a current speed of the preceding vehicle; and
    one or more electronic control units (ECUs) of the host vehicle including a memory storing program instructions and a processor configured to execute the stored program instructions, which when executed cause the one or more ECUs to:
      calculate a relative speed of the host vehicle with respect to the preceding vehicle based on a current speed of the host vehicle and the detected current speed of the preceding vehicle;
      determine whether to activate an engine idle sailing (EIS) function of the host vehicle, in which a driving gear of the host vehicle shifts to neutral, based on the relative speed of the host vehicle with respect to the preceding vehicle and the distance between the host vehicle and the preceding vehicle; and
      in response to determining to activate the EIS function of the host vehicle, control operation of the host vehicle so as to activate the EIS function of the host vehicle, causing the driving gear of the host vehicle to shift to neutral,
    wherein the stored program instructions, which when executed cause the one or more ECUs to determine whether to activate the EIS function of the host vehicle, in which the driving gear of the host vehicle shifts to neutral, further cause the one or more ECUs to:
    determine whether to activate the EIS function of the host vehicle, in which the driving gear of the host vehicle shifts to neutral, based further on whether an accelerator pedal and a brake pedal of the host vehicle are depressed and whether the current speed of the host vehicle exceeds a predetermined EIS activation speed.

14. A non-transitory computer readable medium containing program instructions, which when executed by one or more electronic control units (ECUs) of a host vehicle cause the one or more ECUs to:
    detect a distance between the host vehicle and a preceding vehicle and a current speed of the preceding vehicle;

calculate a relative speed of the host vehicle with respect to the preceding vehicle based on a current speed of the host vehicle and the current speed of the preceding vehicle;

determine whether to activate an engine idle sailing (EIS) function of the host vehicle, in which a driving gear of the host vehicle shifts to neutral, based on the relative speed of the host vehicle with respect to the preceding vehicle and the distance between the host vehicle and the preceding vehicle; and in response to determining to activate the EIS function of the host vehicle, control operation of the host vehicle so as to activate the EIS function of the host vehicle, causing the driving gear of the host vehicle to shift to neutral, wherein the program instructions, which when executed cause the one or more ECUs to determine whether to activate the EIS function of the host vehicle, in which the driving gear of the host vehicle shifts to neutral further cause the one or more ECUs to:

determine whether to activate the EIS function of the host vehicle, in which the driving gear of the host vehicle shifts to neutral, based further on whether an accelerator pedal and a brake pedal of the host vehicle are depressed and whether the current speed of the host vehicle exceeds a predetermined EIS activation speed.

\* \* \* \* \*